(12) United States Patent
Roos et al.

(10) Patent No.: US 11,560,173 B2
(45) Date of Patent: Jan. 24, 2023

(54) METHOD AND CONTROL ARRANGEMENT FOR CONTROLLING VEHICLE FREEWHEEL WITH ENGINE OFF AND POWER STEERING

(71) Applicant: Scania CV AB, Södertälje (SE)

(72) Inventors: Fredrik Roos, Segeltorp (SE); Oscar Flärdh, Älvsjö (SE); Peter Karlsson, Södertälje (SE)

(73) Assignee: Scania CV AB, Södertälje (SE)

( * ) Notice: Subject to any disclaimer, the term of this patent is extended or adjusted under 35 U.S.C. 154(b) by 297 days.

(21) Appl. No.: 16/495,433

(22) PCT Filed: Mar. 13, 2018

(86) PCT No.: PCT/SE2018/050243
§ 371 (c)(1),
(2) Date: Sep. 19, 2019

(87) PCT Pub. No.: WO2018/194500
PCT Pub. Date: Oct. 25, 2018

(65) Prior Publication Data
US 2020/0062302 A1 Feb. 27, 2020

(30) Foreign Application Priority Data
Apr. 21, 2017 (SE) .................... 1750472-1

(51) Int. Cl.
*F02D 28/00* (2006.01)
*B60K 31/00* (2006.01)
(Continued)

(52) U.S. Cl.
CPC ............. *B62D 5/064* (2013.01); *B62D 5/063* (2013.01); *B62D 5/30* (2013.01); *G07C 5/0808* (2013.01)

(58) Field of Classification Search
None
See application file for complete search history.

(56) References Cited

U.S. PATENT DOCUMENTS 7,223,204 B2 5/2007 Steen
7,628,245 B2 12/2009 Osonoi
(Continued)

FOREIGN PATENT DOCUMENTS

CN 1452697 A 10/2003
CN 1796211 A 7/2006
(Continued)

OTHER PUBLICATIONS

Novelty Search Report dated Dec. 23, 2016.
(Continued)

*Primary Examiner* — Adam D Tissot
(74) *Attorney, Agent, or Firm* — Banner & Witcoff, Ltd.

(57) ABSTRACT

A method (300) and control arrangement (210) for controlling a vehicle (100) to freewheel with engine off. The vehicle (100) has an engine (260) for propelling the vehicle (100) and a hydraulic power steering system (400). The hydraulic power steering system (400) comprises a primary power steering pump (270*a*) arranged to be driven by the engine (260) and a secondary power steering pump (270*b*). The method (300) includes: determining (301) when to start freewheeling the vehicle (100) with its engine off; and prior to starting the freewheeling of the vehicle (100) with engine off, determining (302) to start the secondary power steering pump (270*b*).

15 Claims, 4 Drawing Sheets

(51) Int. Cl.
*G07C 5/00* (2006.01)
*G07C 5/08* (2006.01)
*B62D 5/06* (2006.01)
*B62D 5/30* (2006.01)

(56) References Cited

U.S. PATENT DOCUMENTS

| | | | |
|---|---|---|---|
| 9,327,714 B2 | 5/2016 | Pettersson | |
| 2006/0175119 A1* | 8/2006 | Broughton | B62D 5/24 180/422 |
| 2008/0277187 A1 | 11/2008 | Williams et al. | 180/422 |
| 2012/0065852 A1 | 3/2012 | Eriksson | 701/54 |
| 2012/0135841 A1 | 5/2012 | Watanabe | 477/115 |
| 2012/0160594 A1 | 6/2012 | Yoda et al. | 180/422 |
| 2013/0015013 A1 | 1/2013 | Sunaga et al. | 180/421 |
| 2013/0175111 A1* | 7/2013 | Blond | B62D 5/065 180/423 |
| 2014/0114542 A1* | 4/2014 | Abdul-Rasool | B60W 50/0097 701/65 |
| 2014/0163823 A1 | 6/2014 | Kim | 701/43 |
| 2015/0198507 A1* | 7/2015 | Mork | G01M 17/06 701/34.4 |

FOREIGN PATENT DOCUMENTS

| | | |
|---|---|---|
| CN | 1930412 A | 3/2007 |
| CN | 101725708 A | 6/2010 |
| CN | 104487304 A | 4/2015 |
| DE | 10 2015 010 574 A1 | 3/2016 |
| DE | 102016009342 A1 | 2/2017 |
| EP | 2711269 A2 | 3/2014 |
| JP | 2002-249057 A | 9/2002 |
| KR | 20110016114 A | 2/2011 |
| WO | WO 2012/169961 A1 | 12/2012 |

OTHER PUBLICATIONS

Office Action dated Nov. 23, 2017 in corresponding Swedish Patent Application No. 1750472-1.
International Search Report dated May 16, 2018 in corresponding PCT International Application No. PCT/SE2018/050243.
Written Opinion dated May 16, 2018 in corresponding PCT International Application No. PCT/SE2018/050243.
European Search Report, dated Nov. 23, 2020, issued in corresponding European Patent Application No. 18787272.6. Total 8 pages.
Chinese Office Action, dated Jun. 3, 2021, issued in corresponding Chinese Patent Application No. 201880023971.4. English Translation. Total 20 pages.

* cited by examiner

METHOD AND CONTROL ARRANGEMENT FOR CONTROLLING VEHICLE FREEWHEEL WITH ENGINE OFF AND POWER STEERING

CROSS-REFERENCE TO RELATED APPLICATIONS

The present application is a 35 U.S.C. §§ 371 national phase conversion of PCT/SE2018/050243, filed Mar. 13, 2018, the contents of which are incorporated herein by reference which claims priority of Swedish Patent Application No. 1750472-1, filed Apr. 21, 2017, the contents of which are incorporated by reference herein. The PCT International Application was published in the English language.

TECHNICAL FIELD

This document discloses a method and a control arrangement for controlling a vehicle to freewheel with its engine off.

BACKGROUND

Freewheeling functionality with engine running on idle (and the gearbox in neutral/open clutch) has been in production for many years in heavy trucks. The later versions are based on look-ahead systems that in advance can calculate the length of the freewheeling based on road gradient data from a map-database.

While these systems save a lot of fuel, it would be possible to save even more by shutting off the engine completely.

It is a well-known problem that auxiliary systems in conventional vehicles traditionally have been driven by the engine, which makes shutting-off the engine difficult in situations where operating the auxiliary systems are required. The most typical case is the power-steering system, that traditionally have been driven directly by the engine.

A known solution to achieve power steering while the vehicle engine is off, is to replace the engine driven system with an electrical power steering system, and/or a hydraulic system with two different pumps. A drawback of using two pumps is that the losses in the system become unnecessarily large if both pumps are activated continuously.

A two-pump system may be used in so called dual-circuit steering systems, which system generally is installed to achieve power steering redundancy (if the engine mounted pump fails, the engine fails, etc.). All known solutions either run the secondary pump continuously, or starts it when it detects a pressure/flow drop in the primary circuit, i.e. after the engine is shut off.

Document US 2012/0160594 A1 discloses a power steering system which obtains an assistance force of a steering operation according to actuation of a pump. The power steering system comprises a first pump associated with a combustion engine and a second pump associated with an electric motor.

It would be desirable to further explore and develop power steering of vehicles, in particular in freewheeling scenarios, with the engine switched off.

SUMMARY

A drawback with the solution presented in the prior art is that there is an interruption in power steering performance when the engine is turned off, before the second pump is started, which may affect the steering and in a worst-case scenario cause an accident. Further, there is no solution provided in case the second pump (or the associated electric motor) does not work properly, resulting in a malfunctioning power steering performance, which again potentially may cause an accident. A disadvantage of the enumerated briefly described systems is that they require pressure/flow sensors in order to detect when to start the secondary pump.

It would be advantageous to achieve a method and a control arrangement overcoming, or at least alleviating, at least some of the above-mentioned drawback(s). In particular, it would be desirable to enable for improving power steering when freewheeling a vehicle with its engine off. To better address one or more of these concerns, a method and a control arrangement having the features defined in the disclosure herein are provided.

According to a first aspect of the invention, this object is achieved by a method for controlling a vehicle to freewheel with its engine off. The vehicle comprising an engine for propelling the vehicle and a hydraulic power steering system. The hydraulic power steering system comprises a primary power steering pump arranged to be driven by the engine and a secondary power steering pump. The method comprises determining when to start freewheeling the vehicle with the engine off. Further, prior to starting the freewheeling of the vehicle with engine off, the method also comprises determining to start the secondary power steering pump.

According to a second aspect of the invention, this object is achieved by a control arrangement for controlling a vehicle to freewheel with its engine off. The vehicle comprises an engine for propelling the vehicle and a hydraulic power steering system. The hydraulic power steering system comprises a primary power steering pump arranged to be driven by the engine and a secondary power steering pump. The control arrangement is configured to determine when to start freewheeling the vehicle with its engine off. Further, prior to starting the freewheeling of the vehicle with its engine off the control arrangement is configured to, prior to starting the freewheeling of the vehicle with engine off, determine to start the secondary power steering pump.

Thanks to the described aspects, by determining to start the secondary power steering pump before starting the freewheeling of the vehicle with engine off, it becomes possible to turn the engine off without losing power steering assistance. It is thereby possible to save fuel in comparison with freewheeling with the engine running on idle, and yet provide a seamless transfer of steering feel between being supported by the primary power steering pump and the secondary power steering pump. An advantage is that the provided solution does not require flow and/or pressure sensors in the hydraulic circuit, leading to decreased (or at least not increased) production costs. Thanks to the provided solution, it also becomes possible to diagnose that the secondary power steering pump is working properly before shutting off the engine, and freewheeling with the engine running on idle in case the secondary power steering pump is dysfunctional. This thereby avoids that the driver is left without power steering assistance. Thereby, traffic safety is enhanced, both for the vehicle and other road users, while fuel consumption and combustion engine emissions are reduced. Also, noise pollution from the vehicle engine is eliminated.

Other advantages and additional novel features will become apparent from the subsequent detailed description.

FIGURES

Embodiments of the invention will now be described in further detail with reference to the accompanying figures, in which.

DETAILED DESCRIPTION

Embodiments of the invention described herein are defined as a method and a control arrangement, which may be put into practice in the embodiments described below. These embodiments may, however, be exemplified and realized in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1A:
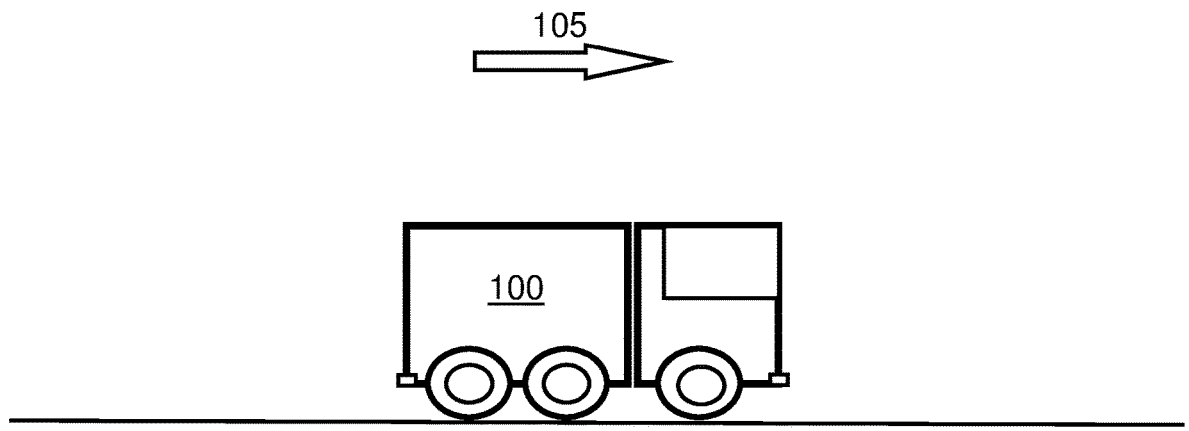
FIG. 1A illustrates a vehicle according to an embodiment of the invention.
Figure 2:
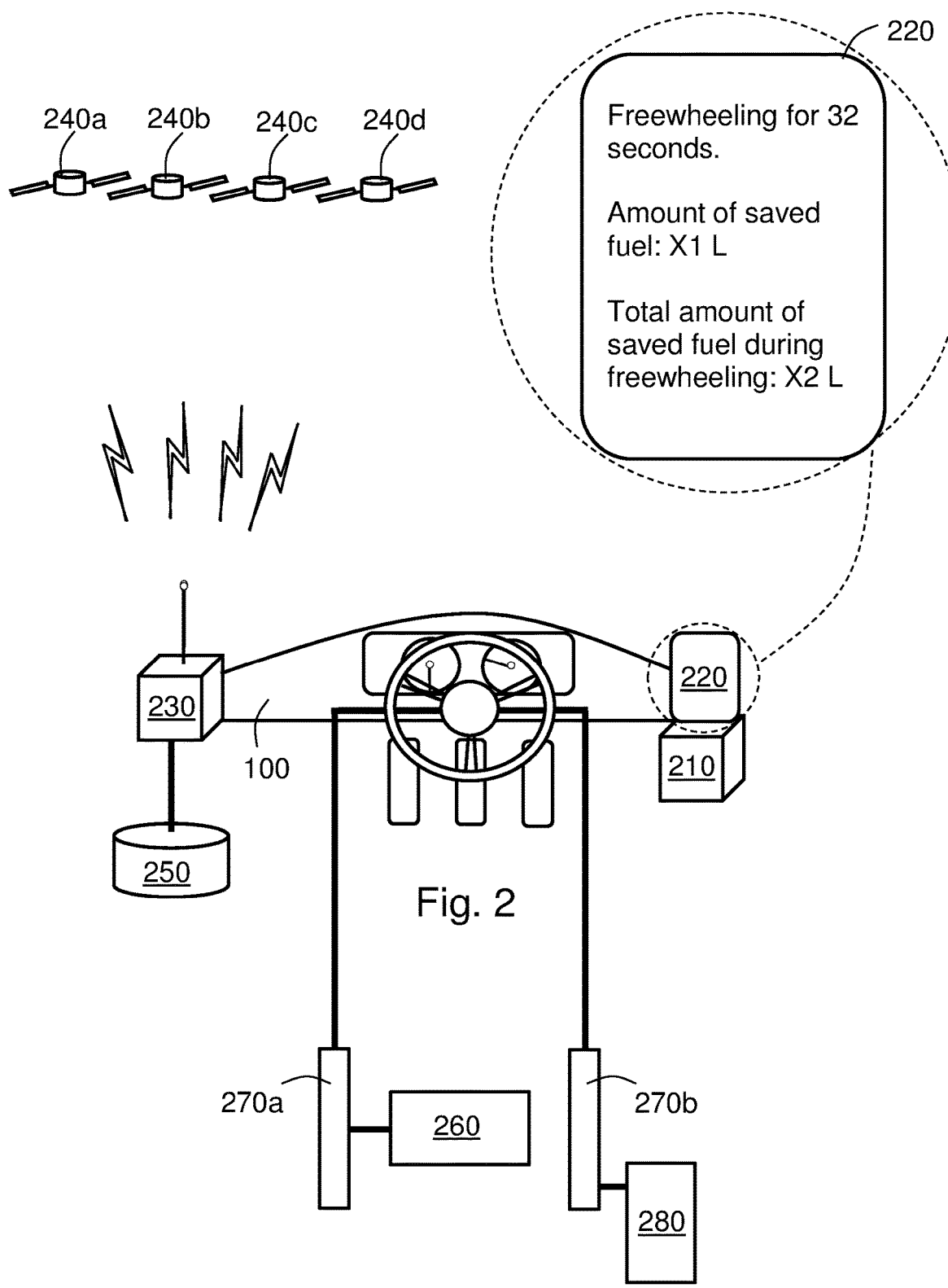
FIG. 2 illustrates a vehicle interior according to an embodiment of the invention.
Figure 4:
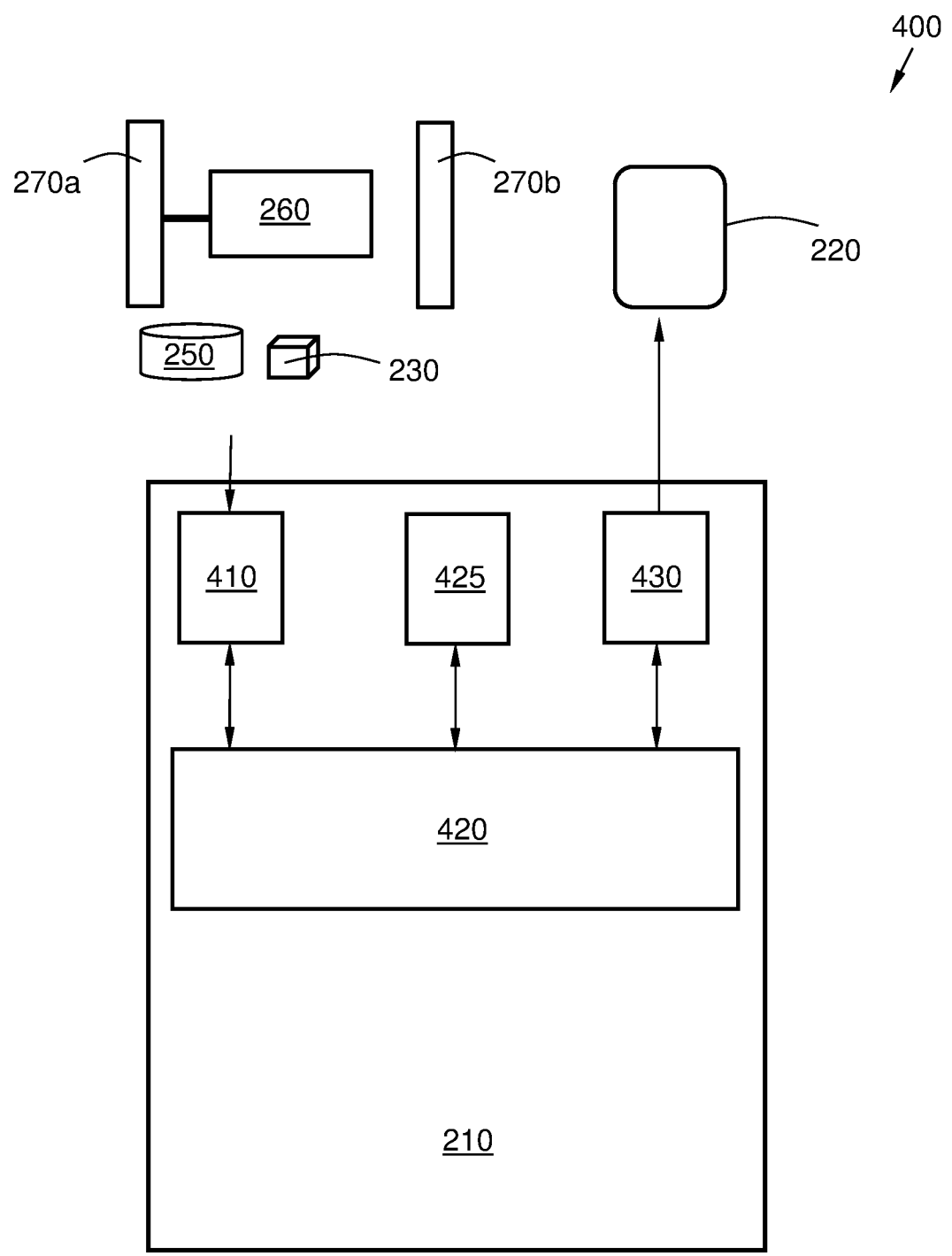
FIG. 4 is an illustration depicting a system according to an embodiment.

FIG. 1A illustrates a scenario with a vehicle 100, driving in a driving direction 105 on a road. Relevant elements of the vehicle are illustrated in FIGS. 2 and 4. The vehicle 100 comprises a hydraulic power steering system 400 with two different pumps, one larger primary pump 270a driven by an engine 260 for propelling the vehicle 100, such as a combustion engine, and one secondary pump 270b, perhaps somewhat smaller than the primary pump, driven for example by an electric motor.

The vehicle 100 may comprise e.g. a truck, a bus, a car, a motorcycle or any similar vehicle or other means of conveyance. The vehicle 100 may be driver controlled or a driverless autonomously controlled vehicle in different embodiments. However, for enhanced clarity, the vehicle 100 is subsequently described in an example as having a driver.

Figure 1B:
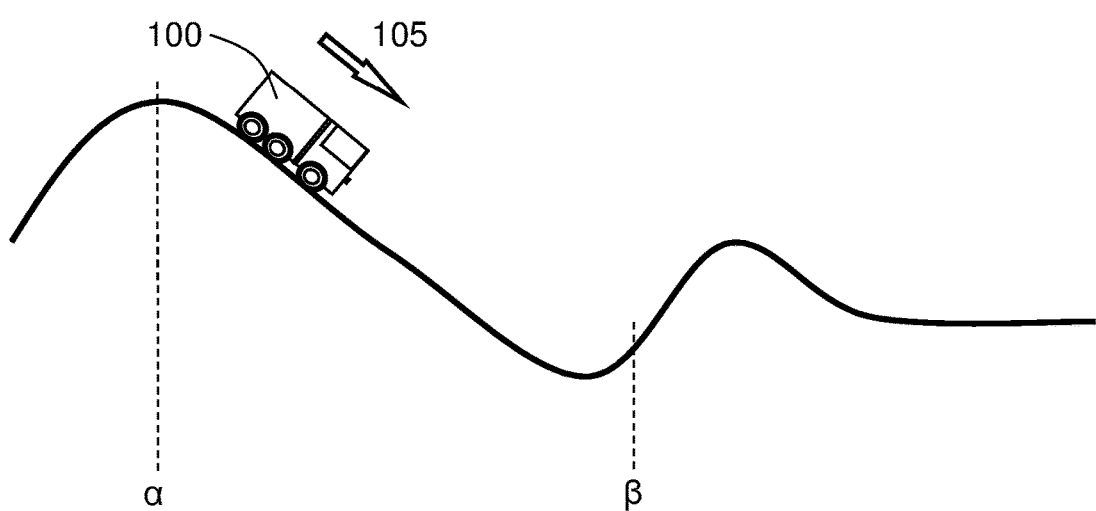
FIG. 1B illustrates a vehicle according to an embodiment of the invention in operations.

FIG. 1B illustrates an example of a scenario where the vehicle 100 presented in FIG. 1A has arrived at a hilly region.

When the vehicle arrives at a downhill slope at a first moment of time α, the vehicle 100 may activate an engine independent power steering functionality, e.g. the secondary pump 270b and then shut off the engine 260 during driving for free-wheeling, in order to save fuel, until the freewheeling is discontinued at a later second moment of time β.

The vehicle 100 is equipped with a hydraulic power steering system 400 comprising two independent power steering pumps 270a and 270b. The primary pump 270a may be driven by the combustion engine 260 while the secondary pump 270b could either be driven by an electric motor or be driven from the vehicle transmission e.g. lay-shaft or main-shaft in a gearbox of the vehicle 100. At least the secondary pump 270b is possible to inactivate in some way, e.g. by shutting down the electric motor, disconnect it mechanically with a clutch, or bypass it hydraulically with a valve, for example e.g. when operation of the secondary pump is not required.

In order to avoid unnecessary losses in the power steering system, it is important to have only one pump active at the same time; although in some cases it may be beneficial to have both pumps simultaneously active, e.g. dry park maneuvering. The herein described concept comprises engaging the secondary pump just before starting a freewheeling situation with the engine off, and disabling the secondary pump right after the engine has started.

The advantage of this mode of operation, as compared with previously known technology that starts the secondary pump after the engine has already have stopped, is that it also allows for diagnosis of the secondary steering pump before the engine shuts down. Further, it also gives a seamless transition in steering feel.

Since the primary pump 270a is driven directly by the engine 400, it is not an option to use the primary pump when the engine is stopped during freewheeling. It is therefore imperative to engage the secondary pump before shutting off the engine. In many cases, this may be beneficial to do as late as possible, in order to minimise losses. Hence, the engine start-stop sequence may look like this, in some embodiments, although the sequential order for at least some of the described steps may be altered.

It may be identified that it is possible to freewheel (with any type of algorithm, e.g. look-ahead based), thereby detecting a downhill sequence which is long enough. Thereafter, or simultaneously, or even somewhat before performance of the previous method step, it may be determined that engine shutdown is possible, e.g. by checking temperatures, battery status, etc. and estimating length of freewheeling, etc. In case freewheeling with the engine off is determined to be possible, it may also be determined to start the secondary power steering pump. In some embodiments, the secondary pump and its functionality may be diagnosed. The engine may then be shut off, and the freewheeling with the engine off may commence, possibly when it has been confirmed that the secondary pump is operable.

When the then freewheeling vehicle 100 is reaching the end of the downhill at the second moment β, the engine 400 of the vehicle 100 may be started, based on any type of algorithm. Then, it may be determined to shut off the secondary power steering pump. In some embodiments, it may be determined to diagnose that the primary pump is working before determining to shutting it off.

The described sequence of actions, or parts thereof, may be implemented together with a look-ahead system, which gives the possibility to start the secondary pump just before the freewheeling optimally is activated and therefore maximize engine-off time, but the sequence itself is relevant for any type of freewheeling algorithm.

Advantages of the herein described embodiments comprise saving fuel in comparison with a system that may be running two pumps constantly. Another advantage is that a seamless transfer of steering feel is provided, compared to a system that starts the secondary pump after the engine has stopped. Yet another advantage is that it does not require flow and/or pressure sensors in the hydraulic circuit. Further, some of the described embodiments provide a possibility to diagnose that the secondary pump is working properly before shutting off the engine. It may thereby avoid that the engine, and thereby also the primary pump, are shut off in a scenario when the secondary pump dysfunctions which would leave the driver without power steering assistance.

FIG. 2 illustrates an example of how the previously described scenario shown in FIG. 1A and FIG. 1B may be perceived by the driver of the vehicle 100. Only those elements related to performance of the method are shown The vehicle 100 comprises a control arrangement 210 configured for controlling a vehicle 100 to freewheel with its engine off. The control arrangement 210 may comprise one control unit, or a plurality of control units in different embodiments. In some embodiments, an output device 220 may be comprised in the vehicle 100, connected to or associated with the control arrangement 210.

The optional output device 220 may comprise e.g. a display, a loudspeaker, a projector, a heads-up display, a display integrated in the windshield of the vehicle 100, a display integrated in the dashboard of the vehicle 100, a tactile device, a portable device of the vehicle driver/owner, a set of close-eyes displays (i.e. intelligent glasses) of the vehicle driver/owner, etc.; or a combination thereof.

Various information related to freewheeling and e.g. saved fuel associated therewith may thereby be outputted to the driver. Further, the driver may be provided an option to override a freewheeling decision, e.g. in case the driver plans to leave the route in a downhill passage, etc.

The control arrangement 210 may be configured for look-ahead prediction of the route of the vehicle 100. Such look-ahead prediction may be based on a determination of current position and driving direction 105 of the vehicle 100, and knowledge of topographic data of the road ahead of the vehicle 100.

For the purpose of determining current position, the vehicle 100 may comprise a positioning unit 230. The positioning unit 230 may be based on a satellite navigation system such as the Navigation Signal Timing and Ranging (Naystar) Global Positioning System (GPS), Differential GPS (DGPS), Galileo, GLONASS, or the like. Thus, the positioning unit 230 may comprise a GPS receiver.

The geographical position of the vehicle 100 may be determined continuously or at certain predetermined or configurable time intervals according to various embodiments.

Positioning by satellite navigation is based on distance measurement using triangulation from a number of satellites 240a, 240b, 240c, 240d shown schematically in FIG. 2. The satellites 240a, 240b, 240c, 240d continuously transmit information about time and date (for example, in coded form), identity (which satellite 240a, 240b, 240c, 240d which broadcasts), status, and where the satellite 240a, 240b, 240c, 240d are situated at any given time. GPS satellites 240a, 240b, 240c, 240d send information encoded with different codes, for example, but not necessarily based on Code Division Multiple Access (CDMA). This allows information from an individual satellite 240a, 240b, 240c, 240d distinguished from the others' information, based on a unique code for each respective satellite 240a, 240b, 240c, 240d. This information can then be transmitted to be received by the appropriately adapted positioning unit 230 in the vehicle 100.

Distance measurement can according to some embodiments comprise measuring the difference in the time it takes for each respective satellite signal transmitted by the respective satellites 240a, 240b, 240c, 240d, to reach the positioning unit 230. As the radio signals travel at the speed of light, the distance to the respective satellite 240a, 240b, 240c, 240d may be computed by measuring the signal propagation time.

The positions of the satellites 240a, 240b, 240c, 240d are known, as they continuously are monitored by approximately 15-30 ground stations located mainly along and near the earth's equator. The geographical position, i.e. latitude and longitude, of the vehicle 100 may thereby be calculated by determining the distance to at least three satellites 240a, 240b, 240c, 240d through triangulation. For determination of altitude, signals from four satellites 240a, 240b, 240c, 240d may be used according to some embodiments. Also, the driving direction 105 may be determined.

Having determined the geographical position of the vehicle 100, and also having determined the driving direction 105 of the vehicle 100, the control arrangement 210 may extract a road slope at a geographical position of the road in front of the vehicle 100 in the determined driving direction 105. This position, i.e. the geographical position in front of the vehicle 100 where the road slope is determined, may be configurable by the driver in some embodiments, and/or may be dependent on the speed of the vehicle 100, such that low speed is associated with a short distance ahead and high speed is associated with a long distance ahead, in some embodiments.

The road slope at the geographical position of the road 120 in front of the vehicle 100 may be extracted from a database 250. The database 250 may be situated within the vehicle 100 in some embodiments, or alternatively be external to the vehicle 100, and accessible by the look-ahead prediction functionality.

In the database 250, different geographical positions are stored associated with topographic data, such as road slope values, or height; which may be extracted from the database 250 by using a geographical position and a driving direction 105 of the vehicle 100, as input values.

The vehicle 100 comprises an engine 260 for propelling the vehicle 100 and a hydraulic power steering system, in turn comprising a primary power steering pump 270a arranged to be driven by the engine 260, and a secondary power steering pump 270b. The secondary power steering pump 270b may be driven by an electric motor 280 in some embodiments. However, in other embodiments, the secondary power steering pump 270b may be mechanically driven by hydraulic bypass and/or driven by a shaft of a gearbox of the vehicle 100, which shaft may be arranged to be disengaged from the engine 260 during freewheeling. The engine 260 may comprise a combustion engine such as a diesel engine, a gasoline engine or an engine driven by biofuel (non-limiting examples).

The control arrangement 210 is configured to determine when to start freewheeling the vehicle 100 with its engine off, e.g. based on the made look-ahead prediction. Further, the control arrangement 210 is configured to determine to start the secondary power steering pump 270b, prior to starting the freewheeling of the vehicle 100 with engine off.

The enumerated elements 210, 220, 230, 250, 260, 270a, 270b, 280 in the vehicle 100 may interactively communicate between themselves via e.g. a wired or wireless communication bus. The communication bus may comprise e.g. a Controller Area Network (CAN) bus, a Media Oriented Systems Transport (MOST) bus, Ethernet or similar. However, the communication may alternatively be made over a wireless connection such as Wifi, Bluetooth, etc.

Figure 3:
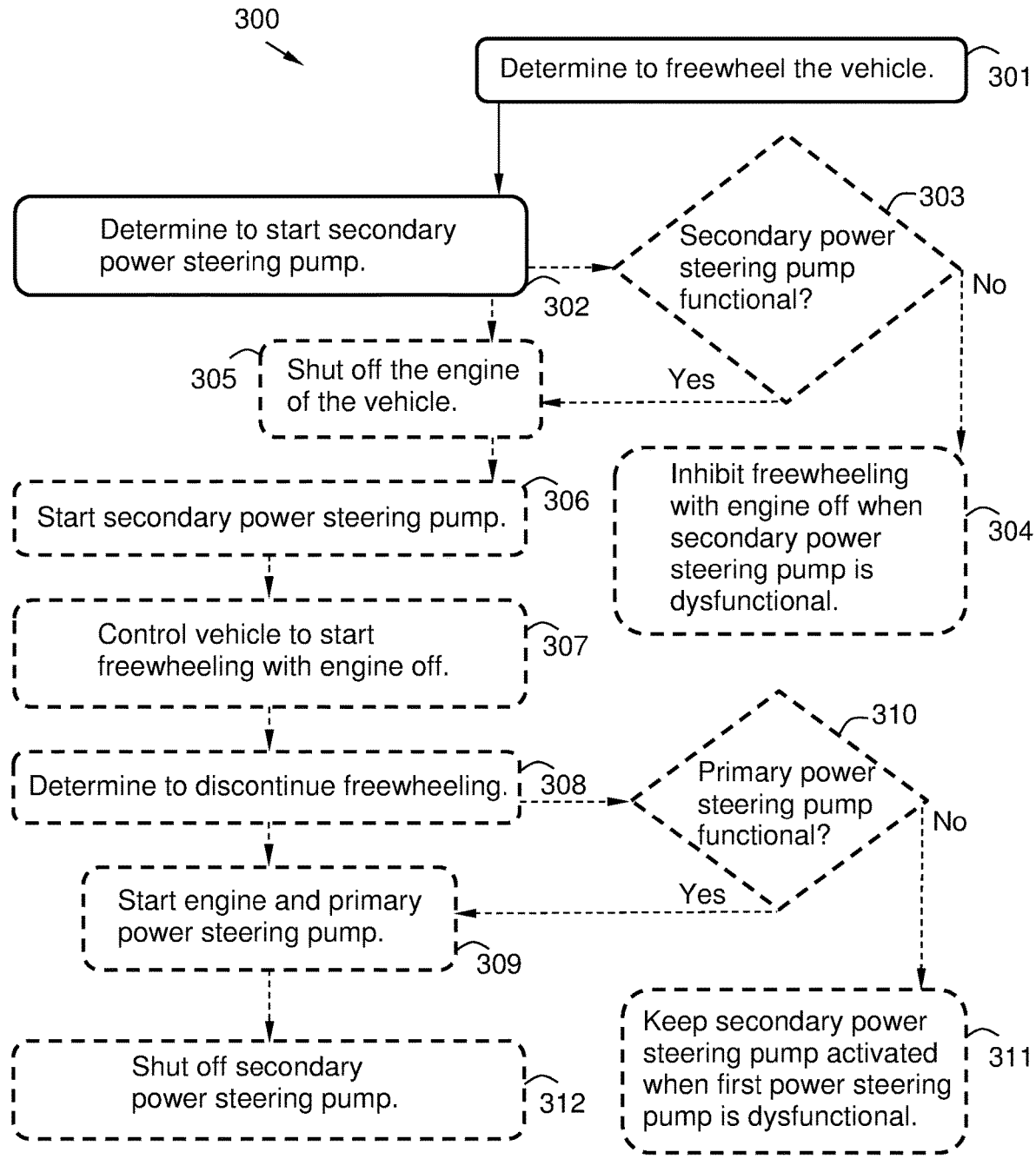
FIG. 3 is a flow chart illustrating an embodiment of the method.

FIG. 3 illustrates an example of a method 300 according to an embodiment. The flow chart in FIG. 3 shows the method 300 in a vehicle 100 comprising an engine 260 for propelling the vehicle 100 and a hydraulic power steering system 400. The hydraulic power steering system comprises a primary power steering pump 270a arranged to be driven by the engine 260 and a secondary power steering pump 270b. The secondary power steering pump 270b may be arranged to be driven separately from the engine 260, e.g. by an electric motor 280.

The method 300 aims at controlling freewheeling with the engine, of the vehicle 100 off.

The vehicle 100 may be any arbitrary kind of means for conveyance on land, such as a truck, a bus, a car, a train, etc.

In order to correctly control vehicle freewheeling, the method 300 may comprise a number of steps 301-311. However, some of these steps 301-311 may be performed solely in some alternative embodiments, such as e.g. steps 303-311. Further, the described steps 301-311 may be performed in a somewhat different chronological order than the numbering suggests. The steps 301-311 of the method 300 may be performed automatically. The method 300 may comprise the sequence of steps:

Step 301 comprises determining when to start freewheeling the vehicle 100 with engine off.

The determination of when to start freewheeling the vehicle 100 with the engine off may be made based on a look ahead algorithm using topographic data of a planned route of the vehicle 100, and geographic position of the vehicle 100, in some embodiments.

Step 302 comprises, prior to starting the freewheeling of the vehicle 100 with the engine off, determining to start the secondary power steering pump 270b.

In some embodiments, a point in time when determining to start the secondary power steering pump 270b may be selected based on: required time to increase pressure/flow in the secondary power steering pump 270b, up to a threshold level; and/or time for the engine 260 to drop speed from current speed to the threshold limit speed.

In some embodiments, the secondary power steering pump 270b may be started before the engine 260 is turned off. However, in other embodiments the decision to start the secondary power steering pump 270b is only made before the engine 260 is turned off, while the secondary power steering pump 270b may be started after the engine 260 has been turned off, or simultaneously with turning off the engine 260.

Step 303, which may be performed only in some embodiments, comprises determining if the secondary power steering pump 270b is functioning.

The determination if the secondary power steering pump 270b is functioning may in some embodiments comprise performing a diagnosis based on one or more of: measuring pressure and/or flow in the secondary power steering pump 270b; checking that the secondary power steering pump 270b is operating, e.g. rotating; checking whether a valve of the secondary power steering pump 270b is closed or open; measuring that a clutch has been closed; and/or measuring current/voltage to an electric machine.

If it cannot be determined that the secondary power steering pump 270b is functioning correctly, the vehicle 100 may still freewheel, but should freewheel with the engine running. The steering is then assisted by the primary power steering pump 270a.

Step 304, which may be performed only in some embodiments wherein step 303 has been performed, comprises inhibiting starting freewheeling of the vehicle 100 with the engine off when it cannot be determined 303 that the secondary power steering pump 270b is functioning.

In such case, the vehicle 100 may still freewheel, but with the engine 260 running in idle mode.

Step 305, which may be performed in only some embodiments, comprises shutting off the engine 260 of the vehicle 100.

Shutting off the engine 260 may mean cutting the fuel supply.

Step 306, which may be performed in only some embodiments wherein step 305 has been performed, comprises starting the secondary power steering pump 270b, before the engine speed of the engine 260 falls below a threshold limit speed.

When the engine 260 is turned off, it will take some time period, e.g. some seconds, for the engine speed to fall from the cruising speed, to zero. The secondary power steering pump 270b may in some embodiments start operating before the primary power steering pump 270a no longer supplies enough pressure/flow, but not necessarily before closing of engine fuelling. In some embodiments, the secondary power steering pump 270b may be started when passing a critical engine speed, such as e.g. idling revolutions or an engine speed which gives enough power steering performance.

The critical engine speed may thus be determined as e.g. the lowest engine speed providing enough power enabling the primary power steering pump 270a to operate adequately, as at idle speed, the minimum speed allowing the engine 260 to be re-started with fuel only, and/or 0 rpm, in different embodiments.

In some embodiments, the moment in time when the secondary power steering pump 270b is to be started, may be set based on: a time period required to increase pressure/flow up to a predefined level, how fast the engine speed of the engine 260 drops when the fuel supply is interrupted, current engine speed, and/or a critical speed when the secondary power steering pump 270b is required to be running.

Step 307, which may be performed in only some embodiments, comprises controlling the vehicle 100 to start freewheeling with its engine off.

Step 308, which may be performed in only some embodiments, comprises determining when to discontinue freewheeling the vehicle 100 with its engine off.

This decision may be made based on input from a route prediction and retrieved topographic data e.g., when it is predicted that the downhill will level out.

Step 309, which may be performed in only some embodiments, wherein step 308 has been performed, comprises starting the engine 260 and the primary power steering pump 270a.

Step 310, which may be performed in only some embodiments, comprises determining that the primary power steering pump 270a is functioning.

Performing a check whether the primary power steering pump 270a is functioning before deactivating the secondary power steering pump 270b avoids that the driver is without power steering assistance.

Step 311, which may be performed in only some embodiments, wherein step 310 has been performed, comprises keeping the secondary power steering pump 270b activated when it cannot be determined 310 that the primary power steering pump 270a is functioning.

In case it is determined 310 that the primary power steering pump 270a is functioning, the secondary power steering pump 270b may be turned off.

Step 312, which may be performed in only some embodiments, wherein step 308 and step 309 has been performed, comprises shutting off the secondary power steering pump 270b.

FIG. 4 illustrates an embodiment of a hydraulic power steering system 400 in a vehicle 100. The hydraulic power steering system 400 comprises a primary power steering pump 270a arranged to be driven by the engine 260. Further, the hydraulic power steering system 400 also comprises a secondary power steering pump 270b.

The hydraulic power steering system 400 furthermore comprises a control arrangement 210. The control arrangement 210 is configured to perform at least some of the previously described steps 301-311 according to the method 300 described above and illustrated in FIG. 3, for controlling the vehicle 100 to freewheel with its engine off. It will be appreciated that the various embodiments described for the method 300 are all combinable with the control arrangement 210.

The control arrangement 210 may comprise a receiving circuit 410 configured for receiving a signal from a map database 250, a positioning unit 230, the primary power steering pump 270a, and the secondary power steering pump 270b.

The control arrangement 210 may also comprise a processing circuitry 420 configured for performing at least some of the calculating or computing of the control arrangement 210. Thus, the processing circuitry 420 may be configured to determine when to start freewheeling the vehicle 100 with the engine off. In addition, prior to starting the freewheeling of the vehicle 100 with the engine off, the processing circuitry 420 may also be configured to, determine to start the secondary power steering pump 270b.

Such processing circuitry 420 may comprise one or more instances of a processing circuit, i.e. a Central Processing Unit (CPU), a processing unit, a processor, an Application Specific Integrated Circuit (ASIC), a microprocessor, or other processing logic that may interpret and execute instructions. The herein utilized expression "processor" may thus represent a processing circuitry comprising a plurality of processing circuits, such as, e.g., any, some or all of the ones enumerated above.

Furthermore, the control arrangement 210 may comprise a memory 425 in some embodiments. The optional memory 425 may comprise a physical device utilised to store data or programs, i.e., sequences of instructions, on a temporary or permanent basis. According to some embodiments, the memory 425 may comprise integrated circuits comprising silicon-based transistors. The memory 425 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

Further, the control arrangement 210 may comprise a signal transmitter 430 which may be configured to transmit a control signal over a wired or wireless interface to be received by the vehicle engine 260, the primary power steering pump 270a, the secondary power steering pump 270b, and/or the output device 220.

The output device 220 may comprise e.g. a display, a loudspeaker, a projector, a heads-up display, a display integrated in the windshield of the vehicle 100, a display integrated in the dashboard of the vehicle 100, a tactile device, a portable device of the vehicle driver/owner, intelligent glasses of the vehicle driver/owner, etc.; or a combination thereof.

The previously described steps 301-311 to be performed in the control arrangement 210 may be implemented through the one or more processing circuitries 420 within the control arrangement 210, together with a computer program product for performing at least some of the functions of the steps 301-311. Thus, a computer program product, comprising instructions for performing the steps 301-311 in the control arrangement 210 may perform the method 300 comprising at least some of the steps 301-311 for controlling a vehicle 100 to freewheel with engine off, when the computer program is loaded into the one or more processing circuitries 420 of the control arrangement 210.

The computer program mentioned above may be provided for instance in the form of a computer-readable medium carrying instructions in the form of a computer program code for performing at least some of the steps 301-311 according to some embodiments when the code is being loaded into the one or more processing circuitries 420 of the control arrangement 210. The computer-readable medium may be, e.g., a hard disk, a CD ROM disc, a memory stick, an optical storage device, a magnetic storage device or any other appropriate medium such as a disk or tape that may hold machine readable data in a non-transitory manner. The computer program may furthermore be provided as computer program code on a server and downloaded to the control arrangement 210 remotely, e.g., over an Internet or an intranet connection.

Further, some embodiments may comprise a vehicle 100, comprising the engine 260 and the above described hydraulic power steering system 400.

The terminology used in the description of the embodiments as illustrated in the accompanying drawings is not intended to be limiting of the described method 300; the control arrangement 210; the hydraulic power steering system 400, the computer program, the computer-readable medium, and/or the vehicle 100. Various changes, substitutions or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" or "comprising", specifies the presence of stated features, actions, integers, steps, operations, elements, or components, but do not preclude the presence or addition of one or more other features, actions, integers, steps, operations, elements, components, or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

The invention claimed is:

1. A method for controlling a vehicle to freewheel with its engine off, wherein
the vehicle comprises an engine for propelling the vehicle and a hydraulic power steering system;
the hydraulic power steering system comprises a primary power steering pump arranged to be driven by the engine and a secondary power steering pump which is not arranged to be driven by the engine;

the method comprises:

determining when to start freewheeling the vehicle with the engine off;

prior to starting the freewheeling of the vehicle with the engine off, and while the secondary power steering pump is off, determining whether to start or not to start the secondary power steering pump; and selecting a point in time when determining to start the secondary power steering pump based on:
  a required time to increase pressure/flow in the secondary power steering pump, up to a threshold level; and
  a time for the engine to drop its speed from a current speed to a threshold limit speed.

2. The method according to claim 1, further comprising:
determining if the secondary power steering pump is functioning to pump; and
inhibiting start of freewheeling the vehicle with the engine off when it cannot be determined that the secondary power steering pump is functioning.

3. The method according to claim 2, wherein the determination if the secondary power steering pump is functioning comprises performing a diagnosis based on one or more of:
measuring pressure and/or flow in the secondary power steering pump;
checking that the secondary power steering pump is operating;
checking whether a valve of the secondary power steering pump is closed/open;
measuring that a clutch of the vehicle has been closed;
measuring current/voltage to an electric machine.

4. The method according to claim 1, wherein the determination of when to start freewheeling the vehicle with the engine off is based on a look ahead algorithm using topographic data of a planned route of the vehicle, and using a geographic position of the vehicle.

5. The method according to claim 1, wherein the secondary power steering pump is driven separately from the engine.

6. The method according to claim 1, further comprising:
determining when to discontinue freewheeling the vehicle with the engine off; and, based on that determination:
starting the engine and the primary power steering pump; and
shutting off the secondary power steering pump.

7. The method according to claim 6, further comprising:
determining if the primary power steering pump is functioning; and
keeping the secondary power steering pump activated to pump when it cannot be determined that the primary power steering pump is functioning.

8. The method according to claim 1, further comprising:
shutting off the engine of the vehicle;
starting the secondary power steering pump, before an engine speed of the engine falls below the threshold limit speed.

9. A method for controlling a vehicle to freewheel with its engine off, wherein
the vehicle comprises an engine for propelling the vehicle and a hydraulic power steering system;
the hydraulic power steering system comprises a primary power steering pump arranged to be driven by the engine and a secondary power steering pump which is not arranged to be driven by the engine; and the method comprises:

determining when to start freewheeling the vehicle with the engine off; and prior to starting the freewheeling of the vehicle with the engine off, determining to start the secondary power steering pump;

shutting off the engine of the vehicle;

starting the secondary power steering pump, before an engine speed of the engine falls below a threshold limit speed; and selecting a point in time when determining to start the secondary power steering pump based on:
  a required time to increase pressure/flow in the secondary power steering pump, up to a threshold level; and
  a time for the engine to drop its speed from a current speed to the threshold limit speed.

10. The method according to claim 1, further comprising:
controlling the vehicle to start freewheeling with the engine off.

11. The method according to claim 1, wherein the steps of the method are performed automatically.

12. A computer program product comprising a non-transitory computer-readable medium containing a program of instructions which, when the program is executed by a computer, cause the computer to carry out the steps of the method according to claim 1.

13. A control arrangement for controlling a vehicle to freewheel with an engine of the vehicle off,
the vehicle comprising an engine for propelling the vehicle and a hydraulic power steering system; and
the hydraulic power steering system comprises a primary power steering pump arranged to be driven by the engine, and a secondary power steering pump not driven by the engine;
wherein the control arrangement is configured to:
determine when to start freewheeling the vehicle with the engine off; and
prior to starting the freewheeling of the vehicle with the engine off, and while the secondary power steering pump is off, determine whether to start or not to start the secondary power steering pump; and
selecting a point in time when determining to start the secondary power steering pump based on:
  a required time to increase pressure/flow in the secondary power steering pump, up to a threshold level; and
  a time for the engine to drop its speed from a current speed to a threshold limit speed.

14. A hydraulic power steering system comprising:
a control arrangement according to claim 13;
a primary power steering pump arranged to be driven by the engine; and
a secondary power steering pump.

15. A vehicle comprising an engine and a hydraulic power steering system according to claim 14.

* * * * *